(12) United States Patent
Aoki (10) Patent No.: US 11,945,000 B2
(45) Date of Patent: Apr. 2, 2024

(54) METHOD FOR REMOVING LINEAR OBJECTS, DEVICE FOR REMOVING LINEAR OBJECTS, AND METHOD FOR PROCESSING ELECTRONIC/ELECTRICAL EQUIPMENT COMPONENT WASTE

(71) Applicant: JX METALS CORPORATION, Tokyo (JP)

(72) Inventor: Katsushi Aoki, Hitachi (JP)

(73) Assignee: JX METALS CORPORATION, Tokyo (JP)

( * ) Notice: Subject to any disclaimer, the term of this patent is extended or adjusted under 35 U.S.C. 154(b) by 0 days.

(21) Appl. No.: 17/909,316

(22) PCT Filed: Mar. 3, 2021

(86) PCT No.: PCT/JP2021/008282
§ 371 (c)(1),
(2) Date: Sep. 2, 2022

(87) PCT Pub. No.: WO2021/177381
PCT Pub. Date: Sep. 10, 2021

(65) Prior Publication Data
US 2023/0108433 A1    Apr. 6, 2023

(30) Foreign Application Priority Data
Mar. 3, 2020    (JP) ................................. 2020-036167

(51) Int. Cl.
*B07B 1/12*    (2006.01)
*B07B 1/36*    (2006.01)

(52) U.S. Cl.
CPC . *B07B 1/12* (2013.01); *B07B 1/36* (2013.01)

(58) Field of Classification Search
CPC ................ B07B 1/00; B07B 1/12; B07B 1/36
(Continued)

(56) References Cited

U.S. PATENT DOCUMENTS

2021/0039138 A1    2/2021    Aoki et al.
2021/0197229 A1    7/2021    Aoki et al.

FOREIGN PATENT DOCUMENTS

EP        102154648 B1 *  1/2020
EP         3747556 A1 *  12/2020   ............... B07B 1/12
(Continued)

OTHER PUBLICATIONS

International Preliminary Report on Patentability for PCT/JP2021/008282 (PCT/IB/373) dated Sep. 15, 2022.
(Continued)

*Primary Examiner* — Terrell H Matthews
(74) *Attorney, Agent, or Firm* — Birch, Stewart, Kolasch & Birch, LLP (57) ABSTRACT

Provided is a method for removing a linear object, a device for removing a linear object, and a method for processing electronic/electrical equipment component waste, which can improve separation efficiency. The method for removing linear objects including: arranging a plurality of filters 3 in a vibrating sieve machine 1 such that the filters 3 are adjacent to each other so as to partially overlap with each other in a feed direction of a raw material, each of the filters 3 comprising a plurality of rods 2 extending at distances in the feed direction of the raw material and a beam portion 21 supporting the plurality of rods 1 at one ends of the plurality of the rods 2, the other ends of the plurality of rods 2 being free ends; arranging a guide 6 below a tip of one of the filters 3 located on a most downstream side in the feed direction; feeding the raw material containing at least linear objects and plate-form objects into the vibrating sieve machine 1; and sorting the linear objects and the plate-form objects by vibrating the filters 3, sieving the linear objects to an under-sieve side of the vibrating sieve machine 1, and capturing lumpy linear objects with the guide.

11 Claims, 5 Drawing Sheets

(58) Field of Classification Search
USPC .................................................. 209/309, 311
See application file for complete search history.

(56) References Cited

FOREIGN PATENT DOCUMENTS

| | | | | |
|---|---|---|---|---|
| JP | 2001279333 | A | * | 10/2001 |
| JP | 2009-142765 | A | | 7/2009 |
| JP | 2015-123418 | A | | 7/2015 |
| JP | 2015-150505 | A | | 8/2015 |
| JP | 2017170388 | A | * | 9/2017 |
| JP | 2019-55390 | A | | 4/2019 |
| JP | 2019055390 | A | * | 4/2019 |
| JP | 2020-37070 | A | | 3/2020 |
| WO | WO2019/151350 | A1 | | 8/2019 |

OTHER PUBLICATIONS

International Search Report for PCT/JP2021/008282 (PCT/ISA/210) dated May 18, 2021.

* cited by examiner

METHOD FOR REMOVING LINEAR OBJECTS, DEVICE FOR REMOVING LINEAR OBJECTS, AND METHOD FOR PROCESSING ELECTRONIC/ELECTRICAL EQUIPMENT COMPONENT WASTE

FIELD OF THE INVENTION

The present invention relates to a method for removing linear objects, a device for removing linear objects, and a method for processing electronic/electrical equipment component waste. More particularly, it relates to a method for removing linear objects, a device for removing linear objects, and a method for processing electronic/electrical equipment component waste, which is suitable for recycling of used electronic/electrical apparatuses.

BACKGROUND OF THE INVENTION

There has been known a device for selectively removing particular foreign matters, for example, linear objects, from objects to be sorted. For example, Japanese Patent Application Publication No. 2015-150505 A (Patent Literature 1) describes an example of a sorting device for sorting a target sorting object from a mixture of long materials by sorting with a vibrating screen and sorting with an air stream.

Further, from the viewpoint of resource conservation in recent years, recovery of variable metals from electronic/electrical equipment component waste such as waste electronic home appliances, PCs, and mobile phones has increasingly become popular, and an efficient method for recovering the valuable metals has been studied. For example, Japanese Patent Application Publication No. 2015-123418 A (Patent Literature 2) discloses that electronic/electrical equipment component waste containing copper is incinerated and then crushed to a predetermined size or less, and the crushed electronic/electrical equipment component waste is processed in a copper blast furnace.

However, as illustrated in FIGS. 8(a) and 8(b), Patent Literature 1 only discloses a sorting device for sorting long wire-form and long scattering target objects, and the method disclosed in the literature does not use any sorting target objects containing foreign matters having shapes other than the long linear objects, such as plate, pillar, and cylindrical shapes, as sorting target objects.

As described in Patent Literature 2, when the incinerated electronic/electrical equipment component waste is processed in the blast furnace, the presence of refining inhibitors such as aluminum, antimony, iron, and nickel in the electronic/electrical equipment component waste may decrease a processing efficiency of the blast furnace for processing the scrap. To suppress the introduction of the refining inhibitors into the blast furnace, it is desirable to carry out the processing for previously reducing the refining inhibitors in the electronic/electrical equipment component waste to be introduced into the blast furnace.

Further, in recent years, separation of single components from the electronic/electrical equipment component waste and processing of them have also been considered. However, under the circumstances, it is difficult to selectively separate and recover desired single components from a wide variety of component scraps having various shapes, and various studies have been made.

In particular, the electronic/electrical equipment component waste contains linear objects such as covered wires, copper wires, and bird's nests (hereinafter referred to as "linear objects" or "wire scrap"). The linear objects are easily entangled with other components and/or equipment when sorting desired single components from a wide variety of component scraps having various shapes, which may cause deterioration of separation accuracy and equipment troubles. Further, coated portions of the coated wires contain Sb which is the refining inhibitor, and the coated wires may be mixed into the blast furnace to affect the operation of the blast furnace.

As a result of careful study, the inventors have proposed a device for removing the linear objects, as described, for example, in International Publication No. 2019/151350 (Patent Document 3), as a sorting device capable of efficiently sorting the linear objects from objects to be stored that include various foreign substances of shapes other than plate-shaped sorted objects and long objects.

CITATION LIST

Patent Literature

[Patent Literature 1] Japanese Patent Application Publication No. 2015-150505 A
[Patent Literature 2] Japanese Patent Application Publication No. 2015-123418 A
[Patent Literature 3] International Publication No. 2019/151350

SUMMARY OF THE INVENTION

However, when the sorting process of linear objects and plate-form objects was continuously performed by using the sorting device as described in Patent Literature 3, it was found that wire scraps became entangled and lumpy at lattice points of beam portions connecting a plurality of rods, and some wire scraps did not fall to the bottom side of the sieve but fell to the plate-form object side and mixed into the plate-form object side. It was also found that lumps of wire scraps tended to be generated from a portion of a pressing member.

In view of the above-described problems, the present disclosure provides a method for removing a linear object, a device for removing a linear object, and a method for processing electronic/electrical equipment component waste, which can improve separation efficiency.

To solve the above-described problems, the inventors have studied diligently and found that it is effective to devise the shape of the filter for sieving linear objects placed in the vibrating sieve machine and to adopt a certain configuration for the tip of the filter at the most downstream side.

In one aspect, a method for removing linear objects according to an embodiment of the present invention completed on a basis of the above findings is a method for removing linear objects including: arranging a plurality of filters in a vibrating sieve machine such that the filters are adjacent to each other so as to partially overlap with each other in a feed direction of a raw material, each of the filters comprising a plurality of rods extending at distances in the feed direction of the raw material and a beam portion supporting the plurality of rods at one ends of the plurality of the rods, the other ends of the plurality of the rods being free ends; arranging a guide below a tip of one of the filters located on a most downstream side in the feed direction; feeding the raw material containing at least linear objects and plate-form objects into the vibrating sieve machine; and sorting the linear objects and the plate-form objects by vibrating the filters, sieving the linear objects to an under-sieve side of the vibrating sieve machine, and capturing lumpy linear objects with the guide.

In one aspect, a method for processing electronic/electrical equipment component waste according to an embodiment of the present invention including: arranging a plurality of filters in a vibrating sieve machine such that the filters are adjacent to each other so as to partially overlap with each other in a feed direction of a raw material, each of the filters comprising a plurality of rods extending at distances in the feed direction of the raw material and a beam portion supporting the plurality of rods at one ends of the plurality of the rods, the other ends of the plurality of the rods being free ends; arranging a guide below a tip of one of the filters located on a most downstream side in the feed direction; feeding the raw material containing at least substrate scraps and wire scraps into the vibrating sieve machine; and sorting the substrate scraps and the wire scraps by vibrating the filters, sieving the wire scraps to an under-sieve side of the vibrating sieve machine, and capturing lumpy wire scraps with the guide.

In one aspect, a device for removing linear objects according to an embodiment of the present invention including: a vibrating sieve machine; a plurality of filters in a vibrating sieve machine such that the filters are adjacent to each other so as to partially overlap with each other in a feed direction of a raw material, each of the filters comprising a plurality of rods extending at distances in the feed direction of the raw material and a beam portion supporting the plurality of rods at one ends of the plurality of the rods, the other ends of the plurality of the rods being free ends; a vibrator configured to vibrate the filters to sieve the linear objects contained in the raw material to an under-sieve side, the raw material containing at least the linear objects and plate-form objects; and a guide provided at a discharge port of the vibrating sieve machine and configured to sort lumpy linear objects and the plate-form objects by holding the lumpy linear objects thereon.

According to the present disclosure, it is possible to provide a method for removing a linear object, a device for removing a linear object, and a method for processing electronic/electrical equipment component waste, which can improve separation efficiency.

BRIEF DESCRIPTION OF THE DRAWINGS

FIG. 7 (*a*) is a schematic view showing a positional relationship of a pressing member, and a sorted state of plate-form objects and linear objects, as viewed from a feed direction of a raw material in a device for removing linear objects; and FIG. 7 (*b*) is a schematic view showing a positional relationship of a pressing member, and a sorted state of plate-form objects and linear objects, as viewed from an extending direction of a rod in a device for removing linear objects.

DETAILED DESCRIPTION OF THE INVENTION

Hereinafter, embodiments of the present invention will be described with reference to the drawings. The embodiments as shown below illustrate devices and methods for embodying the technical idea of the present invention, and the technical idea of the present invention does not limit structures, arrangement, and the like of components to those described below.

Figure 1:
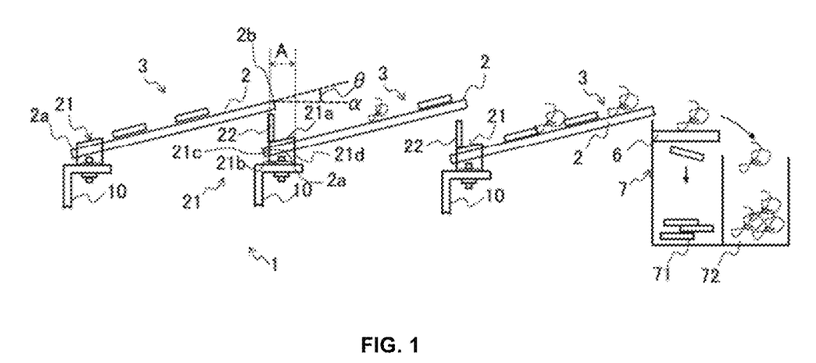
FIG. 1 is a partial side view showing an example of a device for removing linear objects according to an embodiment of the present invention.

As shown in FIG. 1, a device for removing linear objects according to an embodiment of the present invention includes a plurality of filters 3 which are fixed to fixing portions 10 arranged in a vibrating sieve machine 1 (a vibrating sieve machine body) and arranged adjacent to each other in a feed direction of a raw material, a guide provided at a discharge port of the vibrating sieve machine 1, and container 7 including a plate-form object container 71 and a lumpy linear object container 72 provided blow the guide 6. The guide 6 is provided below a tip of one of the filters 3 located on a most downstream side in the feed direction of the raw material. The filters 3 are vibrated by a vibrator (not shown), so that the raw material fed onto the filters 3 are sieved.

The raw material is not particularly limited as long as it is a raw material containing at least linear objects and plate-form objects. The linear objects refer to wire-shaped members each having a short diameter and a long diameter, and may include various wires such as electric wires, cables, and conducting wires, although not particularly limited thereto. The plate-form objects are not particularly limited as long as they are plate-shaped members, and examples of them include substrates, plastic plates, metal plates, and the like. Typically, for example, a plate-shaped member having a surface area of 1 cm$^2$ or more and a thickness of 2 mm or more can be suitably used.

The raw material may contain objects each having a three-dimensional shape other than the wire-form and plate-form, for example, a cylindrical shape, a pillar shape, a rectangular shape, an irregular block shape, and the like. In the following descriptions, a case where electronic/electrical equipment component waste is used as the raw material will be described as an example. However, as described above, the raw material used in the embodiments of the present invention is not, of course, limited to the electronic/electrical equipment component waste.

Also, as used herein, the "electronic/electrical equipment component waste" refers to scrap obtained by crushing electronic/electric apparatuses such as waste home electric appliances, PCs, and mobile phones, recovering them, and then crushing them to an appropriate size. In the present invention, the crushing for obtaining the electronic/electrical equipment component waste may be performed by an operator himself. Crushed objects may be purchased on the market. The crushing may be carried out by any apparatus that is not limited to a specific apparatus. The crushing means is not limited to a specific device, but does not include devices belonging to the category of crushers, and as far as possible, crushing that does not damage the shape of the parts is desirable.

In the present embodiment, the electronic/electrical equipment component waste is preferably crushed to a maximum diameter of 100 mm or less, more preferably 50 mm or less, although not limited thereto. Since it is not efficient in terms of separation efficiency if the electronic/electrical equipment component waste is made too small by crushing, etc., it may be preferable that the waste be crushed to a minimum diameter of 5 mm or more, more preferably 10 mm or more, and even 15 mm or more. Further, it is preferable that the raw material of the electronic/electrical equipment component waste according to the present embodiment is coarsely crushed in advance to separate the scrap as single components in the form of capacitors, plastics, substrates, wire scrap, ICs, connectors, metals and the like. This can lead to easy sorting of specific single components by a rotary sorting machine as described later.

The coarsely crushed electronic/electrical equipment component waste may be subjected to wind power sorting, and lightweight products sorted in the wind power sorting of 3 to 20 m/s may be used as the processing target of the present embodiment. By combining the wind power sorting, sorting efficiency can be improved. The wind power sorting may be performed before or after sieving of the wire scrap as described below. The separation of noble metal-containing materials such as substrates and ICs from metals is preferably carried out at a wind rate of from 10 to 18 m/s, more preferably from 15 to 18 m/s, although it depends on the materials contained in the electronic/electrical equipment component waste. In order to improve the concentration of the capacitor and the metal fraction, the optimum wind rate is preferably from 5 to 15 m/s, and more preferably from 8 to 12 m/s.

When separating plastics from component waste containing films, powders, plastics, and the like, which may affect clogging of the filters or erroneous detection of a sensor in the subsequent sorting process, the wind rate is preferably from 5 to 8 m/s, and more preferably from 6 to 7 m/s.

In the present embodiment, wire scrap is separated from the raw material, i.e., the electronic/electrical equipment component waste herein, as linear objects contained in the electronic/electrical equipment component waste, by sieving with, for example, a vibrating sieve machine 1 as shown in FIG. 1. The "wire scrap" refers to inter-device wirings of electronic/electric apparatuses and electric wires used inside the apparatuses, which are made of copper, copper alloys, aluminum and the like. Wire scraps may include coated wire, copper wire, and elongated linear lumpy scraps. In the present embodiment, "wire scraps" often include copper wires of twisted wires, wires unraveled from braids, etc. These copper wires have thin diameters and are particularly prone to entanglement with other parts scraps. The wire scraps may have a diameter (short diameter) of 0.5 mm or less, 0.2 mm or less, and in some thinner cases, about 0.05 mm or less, but not limited thereto. Some of these wire scraps may have a long diameter of less than 50 mm due to crushing, while others have a long diameter of 50 mm ore more in length. In particular, when copper wire with a long diameter is included, copper wire is particularly soft and tends to become entangled and lumpy debris.

The wire scrap is easily entangled with other components and equipment when sorting the electronic/electric apparatus component scrap, which may cause deterioration of separation accuracy and equipment troubles. Among the wire scrap, the coated wires particularly contain about 0.3% of Sb which is a refining inhibitor, in the coated portion. The mixing of the coated wires into the blast furnace may affect the operation of the blast furnace.

In the present embodiment, when sieving the wire scrap from the electronic/electrical equipment component waste using the vibrating sieve machine 1, the coated wires can be separated by sieving to remove Sb, the refining inhibitor, to the outside of the processing system of the blast furnace.

Figure 2:
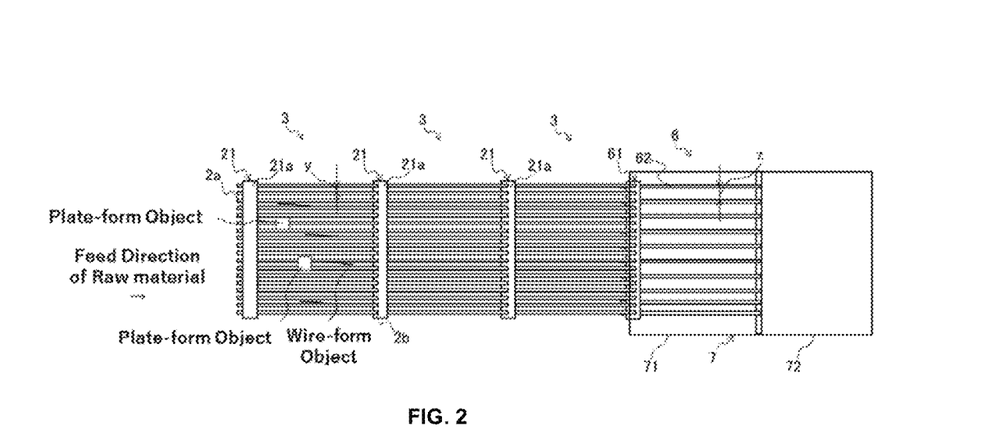
FIG. 2 is a partial top view showing an example of a device for removing linear objects according to an embodiment of the present invention.

The vibrating sieve machine 1 may employ a generally available machine, and its detailed structure is not particularly limited. However, when sieving the linear objects, the shape of each filter 3 is particularly devised. Specifically, as shown in FIG. 1 or FIG. 2, the filters 3 each having a plurality of rods 2 each extending at distances y from each other in the feed direction of the raw material (in the left-right direction in the figure) and beam portions 21 for supporting the plurality of rods at one ends 2a of the plurality of rods 2, the other ends 2b of the plurality of rods 2 being free ends, are arranged in the vibrating sieve machine 1. By arranging the plurality of filters 3 in which the other ends 2b of the plurality of rods 2 are free ends side by side, a decrease in sorting efficiency due to catching of linear objects can be more effectively suppressed. As shown in FIG. 1, the plurality of filters 3 are arranged adjacent to each other so as to partially overlap with each other in the feed direction.

The plurality of rods 2 extend in a direction substantially parallel to the feed direction of the raw material, and extend at distances y so as to be parallel to each other. As shown in FIG. 1, each of the filters 3 is arranged so as to be inclined such that the height on the downstream side in the feed direction of the raw material is higher than that on the upstream side in the feed direction of the raw material. When these filters 3 are horizontally arranged, the full length of the filters 3 becomes longer, resulting in a larger device. On the other hand, by arranging the plurality of filters 3 so as to be inclined as shown in FIG. 1, a conveying distance required for improving the sorting efficiency of the linear objects can be ensured, so that the sorting efficiency of the linear objects from the plate-form objects can be further improved.

On the other hand, if an inclination angle of each filter 3 is too large, the raw material may hit an upper motor (not shown) above the vibrating sieve machine 1, or the raw material may protrude from the vibrating sieve machine 1 to cause the raw material to fall out. Therefore, it is preferable to arrange each of the plurality of filters 3 such that an inclination angle θ of each of the plurality of filters 3 with respect to a horizontal plane is larger than 0° and 45° or less, and more preferably the inclination angle θ is larger than 0° and 30° or less, and even more preferably the inclination angle θ is larger than 0° and 15° or less.

As shown in FIG. 1, the inclination angle θ of each of the plurality of filters 3 with respect to the horizontal plane means an angle formed by a horizontal plane α and an upper surface serving as the conveying surface of each of the plurality of filters 3. All the inclination angles θ of the filters 3 may not be inclined to the same angle, the inclination angles may be changed to appropriate angles depending on arrangement positions of the filters 3. For example, the inclination angle can be gradually decreased or increased in the feed direction.

Figure 3:
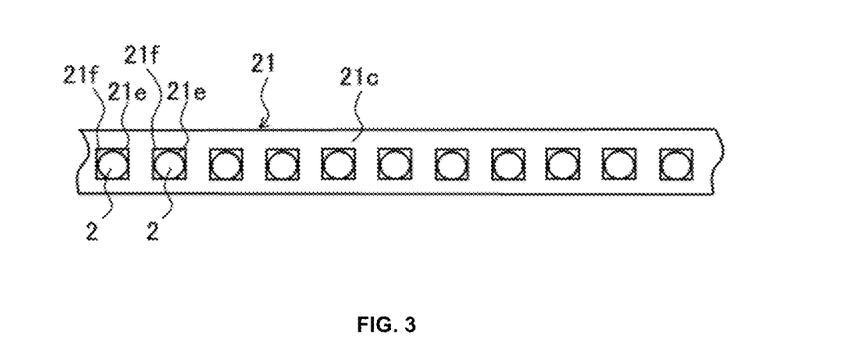
FIG. 3 is a partial side view showing an example of a welded state between a beam portion and a plurality of rods.

The beam portions 21 arranged at one ends 2a of the plurality of rods 2 included in the filters 3 can utilize metal prism blocks each having a hollow or solid central portion. Each beam portion 21 is made of a hollow or solid metal member composed of an upper surface portion 21a extending in a direction intersecting with an extending direction of the plurality of rods 2 on the plurality of rods 2, a lower surface portion 21b opposing to the upper surface portion 21a, and two side surface portions 21c, 21d intersecting with the upper surface portion 21a and the lower surface portion 21b. As shown in FIG. 3, the side surface portion 21c is provided with a plurality of holes 21e, into which the plurality of rods 2 are inserted and fixed by welded portions 21f.

By fixing the plurality of rods 2 through the holes 21e and the welded portion 21f such that the plurality of rods 2 penetrate the beam portion 21, the fixing between the plurality of rods 2 and the beam portions 21 is strengthened. This can allow materials having a relatively large specific gravity such as electronic/electrical equipment component waste to be stably sorted, even if the filters 3 have a cantilever shape in which the beam portions 21 at one ends 2a of the plurality of rods 2 and the other ends 2b are the free ends.

When the filters 3 are arranged adjacent to each other in the feed direction of the raw material, they are preferably arranged such that the upper surface portion 21a of the beam portion 21 possessed by one filter 3 is arranged immediately below the free end that is the other end 2b of the plurality of rods 2 possessed by the other filter 3 adjacent to the one filter 3 on the upstream side in the feed direction of the raw material.

In the arrangement of the filters 3 as shown in FIG. 1, the plate-form objects such as substrate scrap may stand up at a boundary portion between one filter 3 and the other filter 3 during the conveying of the raw material from one filter 3 to the other filter 3, which may cause a phenomenon that the plate-form objects fall out to the under-side of the sieve. However, the filters 3 are arranged such that one filter 3 overlaps with the upper surface portion 21a of the other filter 3 directly below the one filter 3 on the free end side of the other ends 2b of the plurality of rods 2, whereby the phenomenon that the plate-form objects accidentally fall out to the under-side of the sieve at the boundary portion between the filters 3.

Further, when the raw material is conveyed from one filter 3 to the other filter 3, the raw material can be once dropped onto the upper surface portion 21a without directly falling onto the plurality of rods 2. Therefore, any damage of the plurality of rods 2 can be suppressed, so that the sorting device can be operated for a longer period of time without requiring replacement of parts.

Further, as shown in FIG. 1, upon one end 2a of one of the rods 2 is a fall prevention tool 22 that extends in a direction intersecting with the extending direction of the plurality of rods 2, and extends in a substantially vertical direction from one end 2a of the rods 2 toward an upper direction. The fall prevention tool 22 can be arranged in a space between the other end 2b of the rod 2 and one end 2a of the other rod 2 arranged below the other end 2b of the rod 2. The fall prevention tool 22 prevents the raw material that should fall from the other end 2b of the rod 2 to the upper surface portion 21a of the beam portion 21 from accidentally falling to the under-side of the sieve. In particular, when the distance between one end 2a and the other end 2b of the rod 2 becomes longer, the fall prevention tool 22 can be provided to prevent the raw material that should not be separated to the under-sieve side from falling to the under-sieve side. It should be noted that FIG. 1 illustrates an example of the fall prevention tool 22 extending in the substantially vertical direction from the upper surface portion 21a of the beam portion 21, but, of course, the fall prevention tool 22 may be slightly inclined toward the upstream side or the downstream side in the feed direction.

Figure 4:
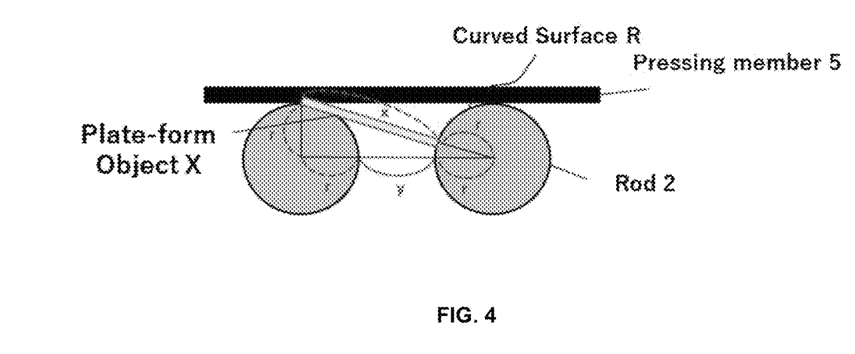
FIG. 4 is a schematic view showing a relationship between a distance and radii of a plurality of rods.

As shown in FIG. 4, a surface of each of the plurality of rods 2 has a curved surface R formed for sieving out the wire scrap under the sieve. Since the wire scrap has a linear shape, if the surface of each of the rods 2 is angular, the wire scrap may be caught by the rods 2 when the wire scrap moves along the feed direction of the raw material to rise, whereby the wire crap may not be properly separated toward the under-side of the sieve.

The curved surface R formed on the surface of each of the plurality of rods 2 can allow smoother contact of the wire scrap with the rods 2, so that the sorting efficiency of the wire scrap can be further improved. In addition, the surface of each of the plurality of rods 2 may be subjected to surface processing for allowing smooth contact with the wire scrap.

Here, it is preferable that a distance between the rods 2 and a diameter of each rod 2 are adjusted based on the size of plate-form objects X contained in the electronic/electrical equipment component waste. More particularly, for example, as shown in FIG. 4, a distance y between the rods 2 and a radius r of each rod 2 are adjusted so as to have a relationship of $r^2+(y+2r)^2=(x+r)^2$, in which x (mm) is an average size (diameter) of the plate-form objects X contained in the electronic/electrical equipment component waste fed on the filter, y is a distance between the rods, and r is a radius of each of the rods.

For example, it is preferable that the distance between the plurality of rods 2 is adjusted such that it is 1.2 to 6 times a characteristic particle diameter of the linear objects and is narrower than the minimum short dimeter of the plate-form objects. As used herein, the "characteristic particle diameter" of the linear objects is determined by extracting arbitrary ten points of the linear objects in the raw material, calculating an average diameter of the extracted ten points of the linear objects on the long diameter side, repeating them 5 times, and calculating an average value thereof to obtain the "characteristic particle diameter". Similarly, the minimum short diameter of the plate-form objects means an average value obtained by extracting arbitrary ten points of the plate-form objects in the raw material, calculating an average diameter of the extracted ten points of the plate-form objects on the short particle size side, and repeating them 5 times.

More particularly, the rod diameter (2r) can be from 1 to 15 mm, for example, although not limited thereto. The distance between the rods can be from 1 to 10 mm, and more preferably from 1.5 to 5 mm. The length of each rod 2 may be typically from 100 to 600 mm, and more preferably from 200 to 400 mm. If it is shorter than 100 mm and there are many long linear objects in the raw material, it becomes more difficult for the long linear objects to fall under the sieve, and the linear objects end to clump together on the sieve. On the other hand, if it is longer than 600 mm, the rods tends to blur more easily due to the vibration.

Figure 6:
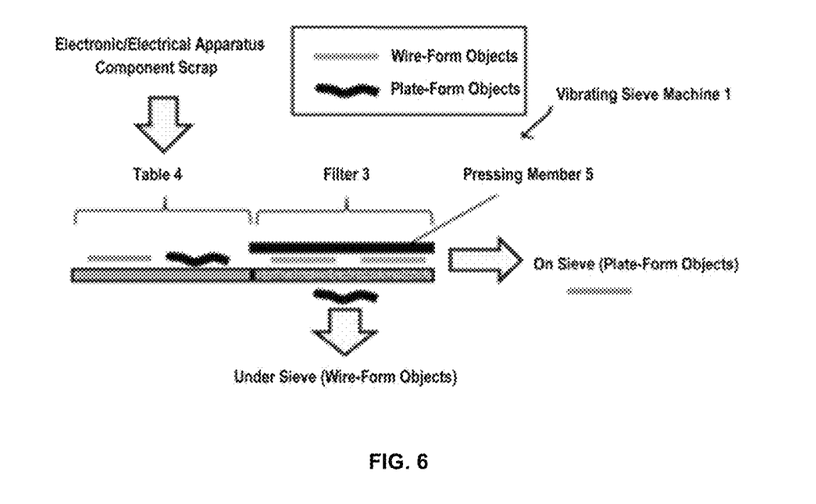
FIG. 6 is a schematic view showing an example of a filter having a beam portion at both ends of a rod.

As shown in FIG. 6, a table 4 can be arranged on a further upstream side of each filter 3. The electronic/electrical equipment component waste is arranged on the filter 3 from the table 4, and vibrated by a vibrator (not shown) on the filters 3, thereby sorting precious metal-containing objects including the plate-form objects such as substrates and ICs on the sieve and sorting the linear objects under the sieve.

The table 4 is formed of a board having a flat plate shape, which does not substantially have a gap for sieving out the wire scrap, and the raw material is first fed onto the table 4 before being fed to the filter 3. First, by vibrating the raw material fed on the table 4, the raw material can be dispersed on the upper surface of the table 4. Then, by feeding the dispersed raw material from the upper surface of the table 4 to the filters 3, an efficiency of sorting the linear objects from the plate-form objects through the filters 3 can be further increased. Further, once vibration is applied to the raw material on the table 4, it also provides an effect that orientations of the linear objects can be aligned. The vibration applied to the table 4 may be substantially the same as the vibration applied to the filters 3.

Figure 7:
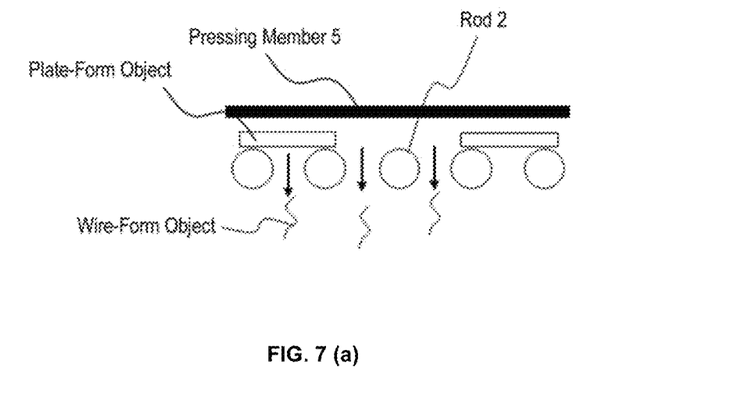

In the present embodiment, it is more preferable that the sieving is performed while arranging a pressing member 5 for pressing the raw material on the raw material placed on the filters 3, as shown in FIG. 7 (*a*). The pressing member 5 may have such a material and shape that can prevent the plate-form objects contained in the raw material from being rotated due to the vibration applied to the filters 3 and prevent the plate-form objects from falling out from the distances between the rods 2.

Examples of the pressing member 5 that can be used include elastic members such as rubber members, resin members and sponge members, which have elasticity and can maintain the raw material by the elastic force. An elastic vinyl sheet and the like can also be used as the pressing member 5. The use of the elastic member as the pressing member 5 can allow it to move together with the raw material while maintaining a constant distance from the vibrating filter 3, so that unnecessary rotation of the plate-form objects in the raw material can be suppressed. The pressing member 5 may be a member having one or more holes so as to have appropriate frictional force with the raw material.

A plurality of pressing members 5 may be laminated upon the raw material fed onto the filters 3. However, excessive lamination may make it difficult to adjust the load for objects having larger variations in the shapes and sizes of the components contained in the raw material. It is possible to apply the load such that the pressing member 5 is pressed from the upper side of the raw material. However, an excessive load may lead to clogging of the space between the pressing member 5 and the filter 3 with the plate-form objects such as substrates.

The thickness of the pressing member 5 can be selected as needed, depending on the raw material used. When using, for example, the rubber member as the pressing member 5, a sheet-shaped member having a thickness of about 2 to 20 mm is preferably arranged so as to cover the raw material. The covering of the raw material with the pressing member 5 can allow an appropriate load to be applied onto the electronic/electrical apparatus components, thereby improving the sorting efficiency. A weight such as an iron plate may be placed on the pressing member 5 to adjust the load.

As shown in FIG. 7 (*b*), one end of the pressing member 5 on the feed side of the raw material has a fixed end that is fixed to the vibrating sieve machine 1, and the other end of the pressing member 5 on the discharge side of the raw material has a free end that is not fixed to the vibrating sieve machine 1. The fixed one end of the pressing member 5 can prevent the pressing member from flowing toward the discharge side of the raw material together with the raw material, and the free other end of the pressing member 5 can allow the other end of the pressing member 5 to become easier to move according to the shape and vibration of the raw material, so that the pressing member 5 can facilitate more appropriate pressing of the raw material.

As shown in FIG. 7 (*b*), the fixed end of the pressing member 5 is fixed to an upper portion (upper end) on a feed side of the vibrating sieve machine 1 for feeding the raw material onto the filter 3. Starting from the fixed end, the pressing member 5 is configured to be suspended from the feed side toward the discharge side of the raw material, and the free end of the pressing member 5 is movable in an up-down direction while pressing the raw material on the filter 3 on the discharge side of the raw material. With such a configuration, on the feed side of the raw material, the raw material can be easily vibrated to easily align the orientations of the linear objects, and on the discharge side of the raw material, the linear objects can be easily sieved toward the under-side of the filters 3 by pressing the movement in the up-down direction due to the vibration of the raw material with the pressing member 5.

The pressing member 5 can be arranged in a such size that covers the entire surface of the filters 3 and at least a part of the guide 6. This can allow unnecessary rotation of all of the raw materials on the filters 3 to be pressed with the single pressing member 5, thereby suppressing the falling out of the plate-form objects from the spaces between the rods 2 and smoothly conveying the raw materials to the side of the guide 6. Alternatively, a plurality of pressing members 5 may be arranged from the feed direction of the raw material to the discharge direction of the raw material.

It should be noted that the pressing member 5 may be arranged on each of the plurality of filters 3, or may be arranged only on the filter 3 on the most upstream side when viewed from the feed side of the raw material.

The sieving of the raw material using the vibrating sieve machine 1 is preferably repeated twice or more. For example, when the electronic/electrical apparatus components are used as the raw material, substrates with components and substrates with no component in the electronic/electrical apparatus components are separated by a first-stage sieving. Then, the second-stage sieving can be further carried out for the substrates with no component to transfer approximately 40% of substrates of the entire electronic/electrical apparatus component onto the sieve.

Further, in addition to the two-step sieving, the load adjustment on the electronic/electrical apparatus components can be carried out with the pressing member 5 to transfer about 70% of substrates contained in the electronic/electrical apparatus components on the sieve at the end of the second-stage sieving, and transfer about 90% of the wire scrap (coated wires) under the sieve.

The vibration is applied to the filter 3 at any magnitude which is not particularly limited as long as the orientations of the linear objects can be aligned. The vibration direction is preferably the same as the extending direction of the rod 2, that is, the direction parallel to the feed direction of the raw material (front-back direction). When carrying out continuous processing, the vibration is preferably applied in the up-down direction in addition to the front-back direction. Any amplitude may be employed as long as the raw material moves forward, and can be set as needed depending on to the throughput of the raw material. A device for supplying the vibration applied to the filter 3 may be of a linear type or a rotary type, and is not particularly limited as long as it can generate predetermined vibration.

For example, the vibration can be applied to the upper surfaces of the filters 3 so that each of a vibration width in a perpendicular direction (a vibration width in the up-down direction) and a vibration width in the front-back direction is from 0.5 to 10 mm. If the vibration width is too high, the separation efficiency of the wire scrap may decrease, and if the vibration width is too low, the effect of vibration cannot be significantly obtained. Therefore, the vibration width may more preferably be from 5 to 8 mm. Alternatively, the filters 3 are vibrated at a frequency of about 50 Hz, and the magnitude of the vibration can be adjusted such that transmissibility (excitation ratio) of vibration transmitted from the vibration source to the filters 3 is between 10 to 90%.

The vibration can be intermittently or continuously applied to the filters 3. By continuously applying the vibration, a recovery process of the wire strap can be stably carried out, and by intermittently applying the vibration, the power required for driving the vibration can be omitted.

Figure 5:
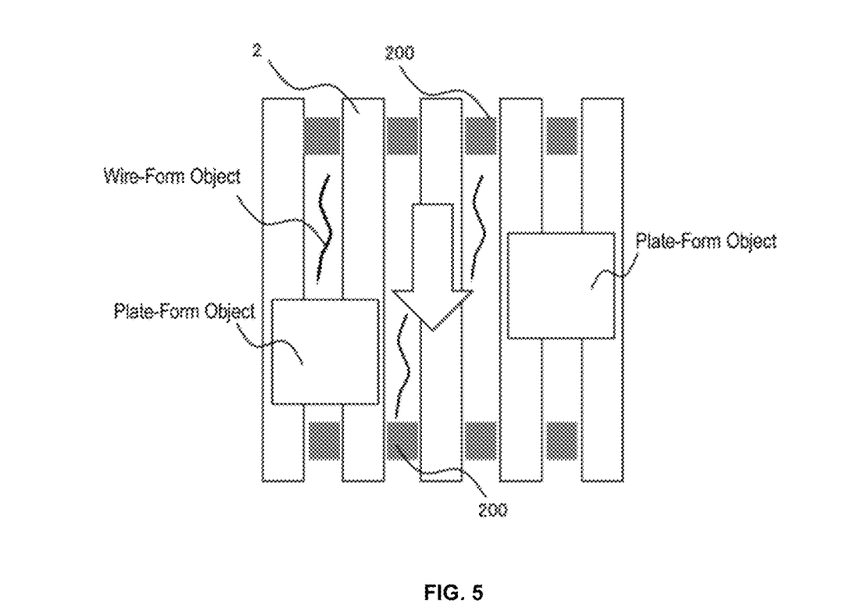
FIG. 5 is a schematic view showing an example of a device for removing linear objects according to an embodiment of the present invention.

As shown in FIG. 5, the use of the filters having the beam portions 200 formed at both ends of the plurality of rods 2, which support the plurality of rods 2, may result in the linear objects caught by the beam portions 200, so that the linear objects may not be sorted well under the sieve. According to the sorting device according to the embodiment of the present invention, the method for sorting linear objects using the same, and the method for processing electronic/electrical equipment component waste, as shown in FIG. 1, the filters 3 in which only one ends 2a of the plurality of rods 2 are provided with the beam portions 21, and the other ends 2b are free ends are arranged in multiple stages while overlapping with each other in the feed direction, so that the catching of the linear objects can be suppressed and the sorting efficiency of the linear objects can be further improved. Each other end 2b of each rod 2 is preferably arranged on an upper surface of a region A in which the upper surface portion 21a of the beam portion 21 is arranged, and more preferably arranged on a position closer to the upstream side in the feed direction of the region A.

Precious metal-containing materials composed of the plate-form objects such as boards, ICs, and the like sorted on the upper side of the sieve by the filters 3 remain on one of the filters 3 at the most downstream side of the feed direction of the raw material and are stored in the plate-form object container 71 for storing the plate-form objects. However, copper wire scraps and fine wires are basically soft, and the longer they are, the easier they are to become entangled. The thin wires may become lumpy and do not drop significantly below the filter 3 (the under-sieve side). In particular, when the raw materials are sieved while being pressed by the pressing member 5, even if the raw materials have been subjected to the removal treatment of copper wire scraps or fine wires in advance before the sieving, the raw materials are more likely to be caught by each other during sieving. In some cases, a large amount of lumpy linear objects are generated and the separation efficiency of the linear objects is decreased.

In the present embodiment, the guide 6 is provided below the tip of the filter 3 (also referred to as the "final filter 3") located on the most downstream side in the raw material feeding direction. With the guide 6, it is possible to capture both the lumpy linear objects contained in the raw material before the vibrating sieve and the lumpy linear objects generated on the vibrating sieve. It is also possible to prevent the linear objects from being mixed into the plate-form object container 71 that accommodates the plate-form objects by sorting the lumpy linear objects and the plate-form objects with the guide 6. In many cases, the lumpy linear objects generated on the vibrating sieve are entangled with each other to form lumps, but the plate-form objects are caught in the gaps between the rods and linear objects entangles with the plate-form objects as a starting point, resulting in lumpy objects.

As shown in FIG. 1, the guide 6 is arranged so as to cover the upper part of the plate-form object container 71 which accommodates the plate-form objects. As shown in FIG. 2, the guide 6 includes a plurality of rods 62 extending at distances z from each other in the feed direction of the raw material (in the left-right direction in the figure) and a beam portion 61 supporting the rods 62. The plurality of rods 62 have a comb tooth shape in which only one end of the rods are fixed to the beam portion 61 and the another end thereof are not fixed to other members. According this configuration, the wire scraps are smoothly sent to the discharge side while preventing them from getting caught on the rods 62. The beam portion 61 of the guide 6 is arranged so as to partially overlap with each other directly below the final filter 3. As a result, the plate-form objects conveyed from the final filter 3 can be received on the beam portion 61 of the guide 6, and the plate-form objects can be dropped toward the plate-form object container 71 through the gap between the rods 62.

The plurality of the rods 62 of the guide 6 extend in a direction substantially parallel to the feed direction of the raw material, and extend so as to be parallel to each other at intervals z. The distance z between the rods 62 of the guide 6 may have a width sufficient for dropping the plate-form object to the lower side of the sieve, and is formed wider than the distance y of the filter 3. When the length of the guide 6 in the transport direction is too short, the lumpy scraps and the plate-form objects may not be sufficiently sorted. If the length of the guide 6 in the transport direction is too long, the lumpy linear objects may become clogged and difficult to remove. The distance z between the rods 62 of the guide 6 can be from 5 to 50 times, more preferably from 10 to 40 times, and further preferably from 15 to 30 times the distance y of the filters 3. The length of the rod 62 of the guide 6 along the raw material feeding direction can be from 100 to 600 mm, more preferably from 150 to 500 mm, still more preferably from 200 to 400 mm. The surface of the rods 62 may have a curved surface shape, and the surface of the rods 62 may be surface-treated to improve sliding with the plate-form objects or the lumpy linear objects.

While the present invention has been described with reference to the above embodiments, the present invention is not limited to each embodiment, and the components may be modified and embodied without departing from the spirit of the present invention. Further, various inventions may be created by appropriately combining the plurality of components disclosed in each embodiment. For example, some components may be removed from all the components shown in the embodiments. Further, the components of different embodiments may be optionally combined.

DESCRIPTION OF REFERENCE NUMERALS 1 vibrating sieve machine
2 rod
3 filter
4 table
5 pressing member
6 guide
10 fixing portion
21 beam portion
21a upper surface portion
21b lower surface portion
21c, 21d side surface portion
21e hole
21f welded portion
22 fall prevention portion
61 beam portion
62 rod
200 beam portion

The invention claimed is:
1. A method for removing linear objects comprising:
arranging a plurality of filters in a vibrating sieve machine such that the filters are adjacent to each other so as to partially overlap with each other in a feed direction of a raw material, each of the filters comprising a plurality of rods extending at distances in the feed direction of the raw material and a beam portion supporting the plurality of rods at one ends of the plurality of the rods, the other ends of the plurality of the rods being free ends;

arranging a guide below a tip of one of the filters located on a most downstream side in the feed direction;

feeding the raw material containing at least linear objects and plate-form objects into the vibrating sieve machine; and sorting the linear objects and the plate-form objects by vibrating the filters, sieving the linear objects to an under-sieve side of the vibrating sieve machine, and capturing lumpy linear objects with the guide.

2. The method for removing the linear objects according to claim 1, wherein the step of sorting the linear objects and the plate-form objects comprises capturing the lumpy linear objects with the guide provided below the tip of the one of the filters, the guide comprising a plurality of rods extending at distances in the feed direction and a beam portion supporting the rods, and wherein the lumpy linear objects are captured on the rods of the guide and the plate-form objects are dropped from between the rods of the guide.

3. The method for removing the linear objects according to claim 1, wherein a distance of the rods of the guide is from 5 to 50 times a distance of the rods of the filters, and a length of the rods of the guide along the feed direction is 100 to 600 mm.

4. The method for removing the linear objects according to claim 1, comprising pressing the raw material provided on one of the filters and the guide from above by means of a pressing member made of elastic material, the pressing member having one end fixed to a feeding side of the vibrating sieve machine and other end being free at a discharge side of the raw material.

5. The method for removing the linear objects according to claim 1, wherein the raw material is electronic/electrical equipment component waste, and wherein the plate-form objects contain substrate scrap, and the linear objects contain wire scrap.

6. A method for processing electronic/electrical equipment component waste comprising:

arranging a plurality of filters in a vibrating sieve machine such that the filters are adjacent to each other so as to partially overlap with each other in a feed direction of a raw material, each of the filters comprising a plurality of rods extending at distances in the feed direction of the raw material and a beam portion supporting the plurality of rods at one ends of the plurality of the rods, the other ends of the plurality of the rods being free ends;

arranging a guide below a tip of one of the filters located on a most downstream side in the feed direction;

feeding the raw material containing at least substrate scraps and wire scraps into the vibrating sieve machine; and sorting the substrate scraps and the wire scraps by vibrating the filters, sieving the wire scraps to an under-sieve side of the vibrating sieve machine, and capturing lumpy wire scraps with the guide.

7. A device for removing linear objects comprising:

a vibrating sieve machine;

a plurality of filters in a vibrating sieve machine such that the filters are adjacent to each other so as to partially overlap with each other in a feed direction of a raw material, each of the filters comprising a plurality of rods extending at distances in the feed direction of the raw material and a beam portion supporting the plurality of rods at one ends of the plurality of the rods, the other ends of the plurality of the rods being free ends;

a vibrator configured to vibrate the filters to sieve the linear objects contained in a raw material to an under-sieve side, the raw material containing at least the linear objects and plate-form objects; and a guide provided at a discharge port of the vibrating sieve machine and configured to sort lumpy linear objects and the plate-form objects by holding the lumpy linear objects thereon.

8. The device for removing the linear objects according to claim 7, wherein the guide comprises a plurality of rods extending at distances in the feed direction and a beam portion supporting the rods, and wherein the lumpy linear objects are captured on the rods of the guide and the plate-form objects are dropped from between the rods of the guide.

9. The device for removing the linear objects according to claim 7, a distance of the rods of the guide is from 5 to 50 times a distance of the rods of the filters, and a length of the rods of the guide along the feed direction is 100 to 600 mm.

10. The device for removing the linear objects according to claim 7, further comprising a pressing member configured to press the raw material from above of the filters, the pressing member made of elastic material and having one end fixed to a feeding side of the vibrating sieve machine and other end being free at a discharge side of the raw material.

11. The device for removing the linear objects according to claim 7, wherein the raw material is electronic/electrical equipment component waste, and wherein the plate-form objects contain substrate scrap, and the linear objects contain wire scrap.

* * * * *